(12) United States Patent
Wang et al.

(10) Patent No.: US 6,572,922 B1
(45) Date of Patent: Jun. 3, 2003

(54) ELIMINATING GEL PARTICLE-RELATED DEFECTS FOR OBTAINING SUB-MICRON FLYABILITY OVER SOL-GEL—COATED DISK SUBSTRATES

(75) Inventors: Hong Ying Wang, Fremont, CA (US); Neil Deeman, Alamo, CA (US); Nobuo Kurataka, Campbell, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/910,812

(22) Filed: Jul. 24, 2001

Related U.S. Application Data
(60) Provisional application No. 60/221,219, filed on Jul. 25, 2000, provisional application No. 60/221,259, filed on Jul. 25, 2000, and provisional application No. 60/221,460, filed on Jul. 25, 2000.

(51) Int. Cl.$^7$ ............................. B05D 3/12; B05D 7/24
(52) U.S. Cl. ................ 427/240; 427/355; 427/389.7; 427/393.6; 427/397.7; 427/419.2; 427/419.7
(58) Field of Search .................. 427/240, 299, 427/387, 397.7, 389.7, 393.6, 407.2, 419.7, 369, 355, 419.2

(56) References Cited

U.S. PATENT DOCUMENTS

| | | | |
|---|---|---|---|
| 3,579,462 A | 5/1971 | Chilton et al. | 252/313 S |
| 4,315,958 A | 2/1982 | Peiffer et al. | 427/214 |
| 4,339,559 A | 7/1982 | McDaniel | 526/106 |
| 4,603,080 A | 7/1986 | Takazawa et al. | 428/331 |
| 4,762,736 A | 8/1988 | Garvey et al. | 427/215 |
| 4,943,479 A | 7/1990 | Yamada et al. | 428/331 |
| 5,067,039 A * | 11/1991 | Godwin et al. | 360/135 |
| 5,308,508 A | 5/1994 | Womack | 210/767 |
| 5,405,689 A | 4/1995 | Usuki et al. | 428/323 |
| 5,626,923 A | 5/1997 | Fitzgibbons et al. | 427/535 |
| 5,914,151 A | 6/1999 | Usuki | 427/128 |
| 5,998,002 A | 12/1999 | Harada et al. | 428/216 |
| 6,068,769 A | 5/2000 | Iio et al. | 210/315 |
| 6,074,879 A * | 6/2000 | Zelmanovic et al. | 436/10 |
| 6,120,836 A * | 9/2000 | Usuki | 427/130 |
| 6,380,265 B1 * | 4/2002 | Pryor et al. | 241/24.1 |

\* cited by examiner

*Primary Examiner*—Shrive P. Beck
*Assistant Examiner*—Kirsten Crockford Jolley
(74) *Attorney, Agent, or Firm*—McDermott, Will & Emery

(57) ABSTRACT

A method of manufacturing a magnetic recording medium comprises steps of:

(a) preparing a sol solution containing gel particles;

(b) treating the sol solution to remove gel particles having a size greater than a predetermined maximum size;

(c) providing a non-magnetic substrate for a magnetic recording medium, the substrate including a surface; and (d) applying a layer of the treated sol solution to the surface of the substrate;

(e) converting the layer of treated sol solution to a layer of sol-gel having a hardness less than that of the surface of the substrate, an exposed surface of the layer of sol-gel having very low surface micro-waviness and substantially no defects in the form of protrusions or bumps;

(f) forming a pattern in the exposed surface of the layer of sol-gel;

(g) converting the layer of sol-gel to a glass or glass-like layer having a density and hardness substantially comparable to that of the surface of the substrate, while preserving the pattern formed in an exposed surface of the glass or glass-like layer and (h) forming a stack of thin film layers over an exposed surface of the glass or glass-like layer formed in step (g), the stack of layers including at least one ferromagnetic layer.

11 Claims, 1 Drawing Sheet

ELIMINATING GEL PARTICLE-RELATED DEFECTS FOR OBTAINING SUB-MICRON FLYABILITY OVER SOL-GEL— COATED DISK SUBSTRATES

CROSS-REFERENCE TO PROVISIONAL APPLICATIONS

This application claims priority from U.S. provisional patent application Ser. Nos. 60/221,219; 60/221,259; and 60/221,460, each filed Jul. 25, 2000, the entire disclosures of which are incorporated herein by reference.

FIELD OF THE INVENTION

The present invention relates to methods for forming servo patterns in substrates for magnetic recording media utilized in high areal, high track density applications, and to magnetic recording media produced thereby. The invention has particular utility in the manufacture of magnetic data/information storage and retrieval media, e.g., hard disks, utilizing very hard surfaced, high modulus substrates such as of glass, ceramic, and glass-ceramic materials.

BACKGROUND OF THE INVENTION

Magnetic recording media are widely used in various applications, particularly in the computer industry. A portion of a conventional recording medium 1 utilized in disk form in computer-related applications is schematically depicted in FIG. 1 and comprises a non-magnetic substrate 10, typically of metal, e.g., an aluminum-magnesium (Al—Mg) alloy, having sequentially deposited thereon a plating layer 11, such as of amorphous nickel-phosphorus (NiP), a polycrystalline underlayer 12, typically of chromium (Cr) or a Cr-based alloy, a magnetic layer 13, e.g., of a cobalt (Co)-based alloy, a protective overcoat layer 14, typically containing carbon (C), e.g., diamond-like carbon ("DLC"), and a lubricant topcoat layer 15, typically of a perfluoropolyether compound applied by dipping, spraying, etc.

In operation of medium 1, the magnetic layer 13 can be locally magnetized by a write transducer or write head, to record and store data/information. The write transducer creates a highly concentrated magnetic field which alternates direction based on the bits of information being stored. When the local magnetic field produced by the write transducer is greater than the coercivity of the recording medium layer 13, then the grains of the polycrystalline medium at that location are magnetized. The grains retain their magnetization after the magnetic field produced by the write transducer is removed. The direction of the magnetization matches the direction of the applied magnetic field. The pattern of magnetization of the recording medium can subsequently produce an electrical response in a read transducer, allowing the stored medium to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop ("CSS") method commences when the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in air, sliding against the surface of the disk, and stopping.

It is considered desirable during reading and recording operations, and for obtainment of high areal recording densities, to maintain the transducer head(s) as close to the associated recording surface(s) as is possible, i.e., to minimize the "flying height" of the head(s). Thus a smooth recording surface is preferred, as well as a smooth opposing surface of the associated transducer head, thereby permitting the head and the disk surface to be positioned in close proximity, with an attendant increase in predictability and consistent behavior of the air bearing supporting the head during motion.

Disk drives typically comprise a magnetic head assembly mounted on the end of a support or actuator arm which positions the head radially over the disk surface. If the actuator arm is held stationary, the magnetic head assembly will pass over a circular path on the disk surface known as a track, and information can be read from or written to that track. Each concentric track has a unique radius, and reading and writing information from or to a specific track requires the magnetic head to be located above the track. By moving the actuator arm, the magnetic head assembly is moved radially over the disk surface between tracks.

The disk drive must be able to differentiate between tracks on the disk and to center the magnetic head over any particular track. Most disk drives use embedded "servo patterns" of magnetically recorded information on the disk. The servo patterns are read by the magnetic head assembly to inform the disk drive of the track location. Tracks typically include both data sectors and servo patterns. Each data sector contains a header followed by a data section. The header may include synchronization information to synchronize various timers in the disk drive to the speed of disk rotation, while the data section is used for recording data. Typical servo patterns are described in, for example, U.S. Pat. No. 6,086,961, the disclosure of which is incorporated herein by reference.

Servo patterns are usually written on the disk during manufacture of the disk drive, after the drive is assembled and operational. The servo pattern information, and particularly the track spacing and centering information, needs to be located very precisely on the disk surface. However, at the time the servo patterns are written, there are no reference locations on the disk surface which can be perceived by the disk drive. Accordingly, a highly specialized device known as a "servo-writer" is used during writing of the servo-patterns. Largely because of the locational precision needed, servo-writers are expensive, and servo-writing is a time-consuming process.

One approach (i.e., "PERM" disks, manufactured by Sony Corp.) to avoid traditional servo-writing has been to injection mold or stamp servo patterns on a polymer-based substrate disk. A constant thickness layer of magnetic recording material is then applied over the entire disk surface, including the depressions and protrusions of the servo patterns. After all of the constituent layers of the medium have been applied to the disk, a magnetic bias is recorded on the servo patterns. For example, a first magnetic field may magnetically initialize the entire disk at a one setting. Then a second magnetic field, located at the surface of the disk and e.g., provided by the magnetic head of the disk drive, is used to magnetize the protruding portions of the servo patterns relative to the depressions. Because the protrusions are closer than the depressions to the magnetic initialization, the magnetization carried by the protrusions may be different than the magnetization carried by the depressions. When read, the resulting disk servo patterns show magnetic transitions between the depressions and the protrusions.

Meanwhile, the continuing trend toward manufacture of very high areal density magnetic recording media at reduced cost provides impetus for the development of lower cost materials, e.g., polymers, glass, ceramics, and glass-ceramics composites as replacements for the conventional Al alloy-based substrates for magnetic disk media. However, poor mechanical and tribological performance, track mis-registration ("TMR"), and poor flyability have been particularly problematic in the case of polymer-based substrates fabricated as to essentially copy or mimic conventional hard disk design features and criteria. On the other hand, glass, ceramic, or glass-ceramic materials are attractive candidates for use as substrates for very high areal density disk recording media because of the requirements for high performance of the anisotropic thin film media and high modulus of the substrate. However, the extreme difficulties encountered with grinding and lapping of glass, ceramic, and glass-ceramic composite materials have limited their use to only higher cost applications such as mobile disk drives for "notebook"-type computers.

Sub-micron flyability (e.g., <0.5 μinch) of the recording transducer or head over a patterned media surface is a stringent requirement for obtainment of very high areal density recording media. However, attempts to achieve the requisite surface topography on glass, ceramic, or glass-ceramic composite substrates have been unsuccessful due to their extreme hardness (e.g., glass substrates have a Knoop hardness greater than about 760 kg/mm$^2$ compared with about 550 kg/mm$^2$ for Al alloy substrates with NiP plating layers). In addition, the low flowability and extreme hardness of these substrate materials effectively precludes formation of servo patterns in the surfaces thereof by injection molding or stamping, as has been performed with polymer-based substrates.

A recently developed approach for forming servo patterns in hard-surfaced, high modulus alternative substrate materials, such as the glass, ceramic, and glass-ceramic materials described above, is based upon the discovery that the surfaces of such materials may be modified, i.e., reduced in hardness, so as to facilitate formation of servo patterns therein, as by a simple and conveniently performed embossing process. According to this methodology, modification (i.e., reduction) of surface hardness of high modulus substrates for use in the manufacture of thin film magnetic recording media is obtained by first forming a relatively soft coating layer on the substrate surface, embossing the desired servo pattern in the exposed upper surface of the relatively soft coating layer, and then converting the relatively soft layer to a relatively hard layer while retaining the embossed servo pattern therein. The thus-formed substrate with embossed servo pattern in the exposed surface thereof is then subjected to thin film deposition thereon for forming the layer stack constituting the magnetic recording medium. Thus, the method advantageously provides servo-patterned magnetic recording media without requiring servo-writing subsequent to media fabrication.

More specifically, according to the above methodology, a relatively soft layer of a sol-gel is initially formed on the surface of the high modulus glass, ceramic, or glass-ceramic composite substrate, e.g., in disk form. By way of illustration, but not limitation, a sol-gel layer having a thickness of from about 0.2 to about 1 μm may be formed on the substrate surface by any convenient technique, e.g., spin coating of a solution of the sol-gel. A suitable sol-gel solution for use according to the invention may be prepared by mixing an alkoxide, e.g., a silicon alkoxide such as tetraethoxysilane ("TEOS") or tetramethoxysilane ("TMOS"), water, and nitric acid at molar ratios of TEOS or TMOS/H$_2$O/HNO$_3$ of 1/4–30/>0.05. The nitric acid acts as a catalyst for conversion of the TEOS or TMOS to a SiO$_2$ sol according to the following reaction (1), illustratively shown for TEOS:

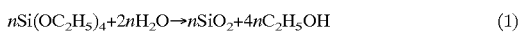

$$n\text{Si}(\text{OC}_2\text{H}_5)_4 + 2n\text{H}_2\text{O} \rightarrow n\text{SiO}_2 + 4n\text{C}_2\text{H}_5\text{OH} \qquad (1)$$

with ethanol (C$_2$H$_5$OH) being produced as a reaction product in solution. After completion of reaction, butanol (C$_4$H$_9$OH) is added to the solution as a drying retardation agent at molar ratios of TEOS/H$_2$O/HNO$_3$/C$_4$H$_9$OH of e.g., 1/5/0.05/>4. Such solution, when applied to the substrate surface as by spin coating, forms a very smooth film with a minimum amount of surface microwaves. The resultant film or layer is glass-like, principally comprised of silica (SiO$_2$) molecular clusters together with the various solvents (H$_2$O, C$_2$H$_5$OH, C$_4$H$_9$OH), and adheres well to the substrate surface. The sol-gel film or layer is of a porous structure with the solvents saturated in the micropores thereof.

The as-deposited, relatively soft sol-gel film or layer applied to the hard-surfaced substrate is then subjected to an embossing process for forming a servo pattern in the surface thereof, comprising a patterned plurality of depressions and protrusions, e.g., by utilizing a stamper having a negative image of the desired servo pattern or an equivalently performing device. The exposed, upper surface of the relatively soft sol-gel layer may also be subjected to mechanical texturing (after drying in air but prior to sintering), e.g., as by a standard NiP texturing process utilizing an abrasive size of about 0.25 μm, in order to enable formation of oriented media critical for achieving high areal density recording.

Subsequent to servo pattern formation (and mechanical texturing, if desired) of the as-deposited, relatively soft sol-gel film or layer, a sintering process is performed at an elevated temperature of from about 300 to above about 1000° C. (depending upon the withstand temperature of the substrate material, i.e., which temperature is higher for ceramic-based substrates than for glass-based substrates) at e.g., a ramping rate from about 0.5 to about 10° C./min. and a dwell time of about 2 hrs., to evaporate the solvents so as to effect at least partial collapse of the micro-pores, with resultant densification of the sol-gel film or layer into a substantially fully densified glass layer having a density and hardness approaching that of typical silica glass (<1.5 g/cm$^3$), or into a partially densified "glass-like" layer. The embossed servo pattern (and mechanical texturing) formed in the exposed upper surface of the relatively soft sol-gel layer is preserved in the corresponding exposed upper surface of the sintered glass or glass-like layer.

Formation of thin film magnetic media on the thus-formed glass-coated, servo patterned/mechanically textured substrates is accomplished utilizing conventional thin film deposition techniques, e.g., sputtering, for forming the layer stack comprising a polycrystalline underlayer, magnetic layer, and protective overcoat layer.

The above-described sol-gel-based process combines the advantages of low-cost processing with the superior optical, mechanical, and chemical proprties of silica glass ($SiO_2$) for fabricating high performance, servo-patterned magnetic recording media, and thus is an attractive candidate for future disk-based magnetic recording media and systems. However, as indicated above, in order to achieve high areal density magnetic recording utilizing such alternative substrate materials with embossed servo patterns formed in spin-coated sol-gel layers, obtainment of sub-micron transducer head flyability over substantially mirror-like surfaces is required. Alternatively stated, in order to achieve fly heights lower than about 0.5 $\mu$in., the spin-coated sol-gel film must have an extremely low surface waviness, and substantially no surface defects arising from gel particles which can result in glide hits by the flying transducer head leading to poor performance and even head crash.

Referring again to reaction (1), silica gel (i.e., $SiO_2$) particles, in the form of molecular clusters, are formed in the solution, which particles grow with time during transformation of the solution from a sol to a gel, the growth process being temperature sensitive. The produced gel particles form protrusions, e.g., bumps, extending upwardly from the surface of the film spin-coated on the substrate surface, which bumps cause high defect counts and disadvantageously result in glide hits. The gel particles cannot be removed from the sol solution prior to spin coating by common filtration techniques such as membrane filtration, because the resilient particles easily deform when under pressure into elongated shapes which pass through the membrane and then return to their original spherical shape after passage through the membrane filter. In point of fact, studies have demonstrated that a sol solution filtered through a 0.2 $\mu$m syringe-type filter can result in film surfaces with gel particle defect sizes larger than about 60 $\mu$m.

Another source of large gel particle formation associated with reaction (1) is at the mixing stage. Specifically, reaction (1) is exothermic, and the released thermal energy may lead to a considerable increase in the sol temperature, leading to premature and accelerated gel particle growth.

In view of the above, there exists a need for improved methodology and means for providing disk substrates for magnetic recording media, which substrates are constituted of very hard materials, with at least one surface of requisite topography for enabling operation with flying head read/write transducers/heads operating at very low flying heights and with servo patterns provided therein, as by embossing. More specifically, there exists a need for an improved method for forming mirror-smooth sol-gel films or layers on substrates, which films or layers are substantially free of surface defects, such as bumps or protrusions which can deleteriously affect the performance of read/write transducers operating at sub-micron flying heights. In addition, there exists a need for an improved, high areal density magnetic recording medium including a high hardness, high modulus substrate having a servo pattern integrally formed therewith, as by embossing of a sol-gel layer, and capable of operation with read/write transducers operating at sub-micron flying heights.

The present invention addresses and solves problems and difficulties attendant upon the formation of sol-gel films on the surfaces of very hard materials, e.g., of glass, ceramic, or glass-ceramic, utilized as substrate materials in the manufacture of very high areal density magnetic recording media, while maintaining full capability with substantially all aspects of conventional automated manufacturing technology for the fabrication of thin-film magnetic media. Further, the methodology and means afforded by the present invention enjoy diverse utility in the manufacture of various other devices and media requiring formation of mirror-smooth surfaces.

DISCLOSURE OF THE INVENTION

An advantage of the present invention is an improved method of manufacturing a magnetic recording medium.

Another advantage of the present invention is an improved method for forming a low micro-waviness, substantially defect-free layer on a substrate for a magnetic recording medium for achieving reliable operation with read/write transducers at sub-micron flying heights.

Still another advantage of the present invention is an improved method for forming high areal recording density magnetic recording media including mechanically embossed servo patterns.

Yet another advantage of the present invention is an improved, high areal recording density magnetic recording medium capable of reliable operation with read/write transducers at sub-micron flying heights.

A still further advantage of the present invention is an improved, high areal recording density magnetic recording medium including a high modulus substrate and an embossed servo pattern.

Additional advantages and other aspects and features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a magnetic recording medium, comprising the steps of:

(a) preparing a sol solution containing gel particles;

(b) treating the sol solution to remove therefrom gel particles having a size greater than a predetermined maximum size;

(c) providing a non-magnetic substrate for a magnetic recording medium, the substrate including at least one surface; and (d) applying a layer of the treated sol solution to the at least one surface of the substrate.

In accordance with embodiments of the present invention, step (a) comprises forming a silica ($SiO_2$) sol solution containing $SiO_2$ gel particles and (a) further comprises removing heat generated during the preparing from the sol solution to minimize formation of large $SiO_2$ gel particles; step (b) comprises treating the sol solution to remove gel particles having a size greater than about 5 $\mu$m.

According to particular embodiments of the present invention, step (b) comprises passing the sol solution through a depth filter having a pore size of about 5 $\mu$m or treating the sol solution by ultra-centrifugation at a G-force greater than about 50,000 G and a spin speed greater than about 10,000 rpm.

According to further embodiments of the present invention, step (c) comprises providing a substrate comprised of a high modulus, hard-surfaced, non-magnetic material, e.g., a disk-shaped substrate formed of a glass, ceramic, or glass-ceramic material; and step (d) comprises applying the layer of treated sol solution to the at least one surface of the substrate by spin-coating.

In accordance with embodiments of the present invention, the method further comprises the steps of:

(e) converting the layer of treated sol solution to a layer of sol-gel having a hardness less than that of the at least one surface of the substrate, an exposed surface of the layer of sol-gel having very low surface micro-waviness and substantially no defects in the form of protrusions or bumps;

(f) forming a pattern in the exposed surface of the layer of sol-gel; and (g) converting the layer of sol-gel to a glass or glass-like layer having a density and hardness substantially comparable to that of the at least one surface of the substrate, while preserving the pattern formed in step (f) in an exposed surface of the glass or glass-like layer.

According to particular embodiments of the present invention, step (e) comprises converting the layer of treated sol solution into the layer of sol-gel by removing a portion of the solvent(s) contained in the layer of treated sol solution; step (f) comprises mechanically embossing a servo pattern in the exposed surface of the layer of sol-gel; and step (g) comprises forming the glass or glass-like layer by substantially completely removing the solvent(s) from the layer of sol-gel; wherein step (e) comprises removing a portion of the solvent(s) contained in the layer of treated sol-gel solution during step (d) of applying a layer of the treated sol solution to the at least one surface of the substrate; step (f) comprises mechanically embossing the servo pattern in the exposed surface of the layer of sol-gel by applying thereto a surface of a stamper, the surface of the stamper including a negative image pattern of the servo pattern; and step (g) comprises substantially completely removing the solvent(s) from the layer of sol-gel by sintering the layer of sol-gel at an elevated temperature for a predetermined interval.

In accordance with embodiments of the present invention, the method further comprises the step of:

(h) forming a stack of thin film layers over an exposed surface of the glass or glass-like layer formed in step (g), the stack of layers including at least one ferromagnetic layer.

Another aspect of the present invention is a magnetic recording medium, comprising:

(a) a non-magnetic substrate having at least one major surface;

(b) a $SiO_2$-containing layer derived from a layer of a sol-gel formed on the at least one major surface of the substrate, the $SiO_2$-containing layer including an upper surface having low surface micro-waviness and substantially no defects in the form of bumps or protrusions; and (c) a stack of thin film layers formed over the upper surface of said $SiO_2$-containing layer, the stack of layers including at least one ferromagnetic layer.

According to embodiments of the present invention, the non-magnetic substrate (a) is disk-shaped with a pair of opposed major surfaces, and is comprised of a high modulus material selected from glasses, ceramics, and glass-ceramic composite materials; the $SiO_2$-containing layer (b) has a density and hardness substantially similar to that of glass; and the upper surface of the $SiO_2$-containing layer (b) includes a mechanically embossed servo pattern.

Still another aspect of the present invention is a magnetic recording medium, comprising:

(a) a non-magnetic substrate having at least one surface, the substrate being comprised of a high modulus material selected from glasses, ceramics, and glass-ceramics materials; and (b) means on the at least one surface of the substrate for achieving sub-micron flyability of a transducer head over a surface of the medium.

According to embodiments of the present invention, means (b) is a $SiO_2$-containing layer derived from a sol-gel and has low surface microwaviness and substantially no surface defects in the form of bumps or protrusions; and means (b) further includes a mechanically embossed servo pattern.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWING

The following detailed description of the embodiments of the present invention can best be understood when read in conjunction with the following drawing, in which the features are not necessarily drawn to scale but rather are drawn as to best illustrate the pertinent features, wherein.

DESCRIPTION OF THE INVENTION

Figure 1:
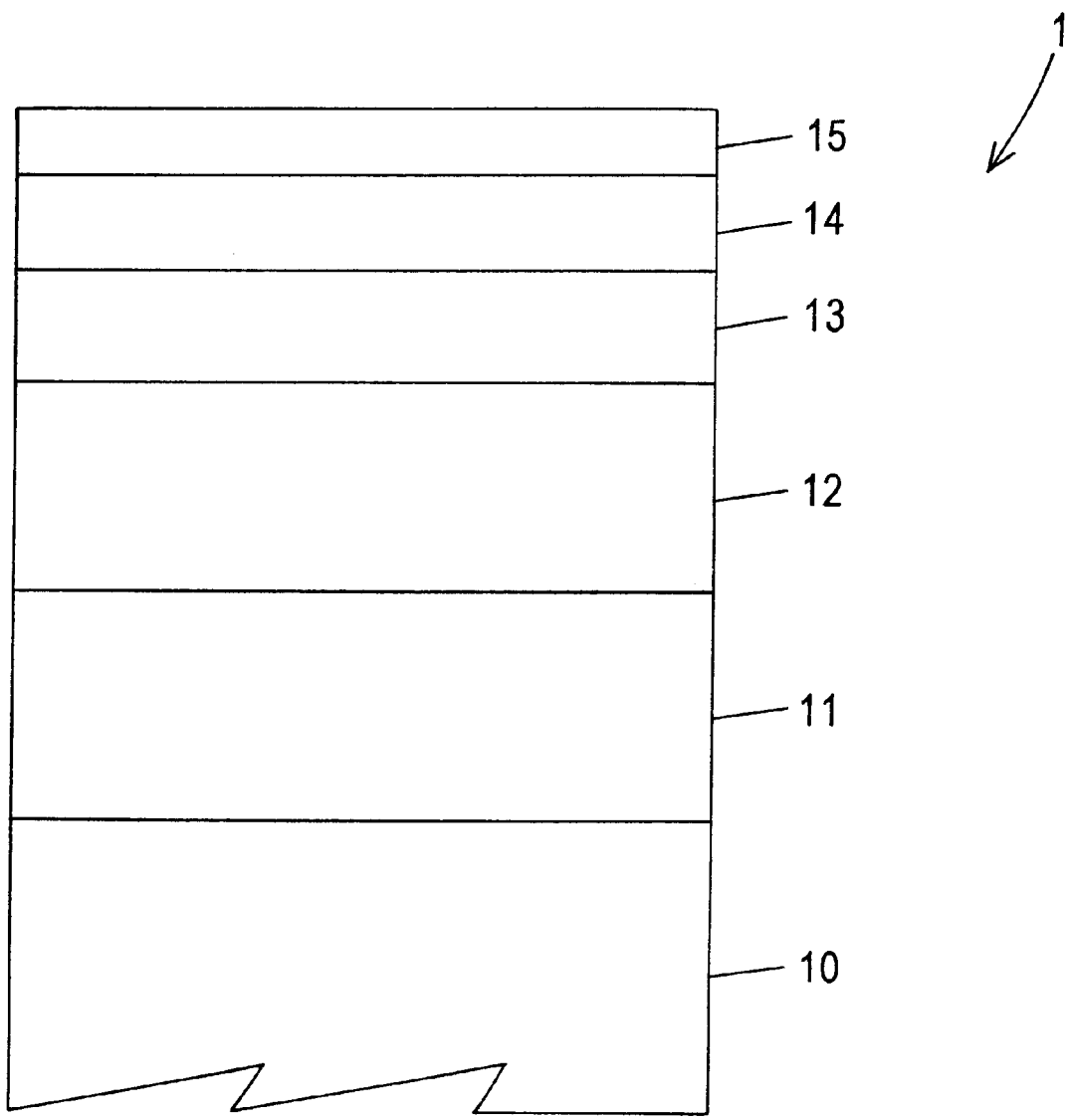
FIG. 1 illustrates, in schematic, simplified cross-sectional view, a portion of a thin film magnetic data/information recording/storage medium.

The present invention addresses and solves problems attendant upon the use of very hard surfaced, high modulus materials, e.g., of glass, ceramics, or glass-ceramic composites, as substrates in the manufacture of thin film, high areal density magnetic recording media, and is based upon the discovery that sub-micron flyability of read/write transducer heads over such type substrates provided with a servo pattern-embossed glass or glass-like layer derived from a silica ($SiO_2$)-containing sol-gel layer can be achieved by reducing defects in the surface of the glass or glass-like layer, such as bumps or protrusions resulting from the presence of large $SiO_2$ gel particles in a layer of a sol solution applied to the substrate surface as part of the sol-gel layer formation process.

More specifically, according to the prior methodology, a sol solution is initially produced, as for example, by mixing a solution of a silicon alkoxide, water, and an acid, to form $SiO_2$ gel particles in the solution, i.e., molecular clusters. The gel particles grow over time during transformation of the solution from a sol to a gel, which process is temperature sensitive. The presence of such large $SiO_2$ gel particles in the solution which is then applied to the substrate surface, e.g., by spin coating, for conversion into a relatively soft sol-gel layer suitable for mechanical embossing of servo patterns in the surface thereof, is disadvantageous in that they form surface defects, such as bumps or protrusions, extending from the upper surface of the sol-gel layer (and any layers subsequently formed thereover), resulting in interference ("glide hits") with the low flying read/write transducer head, thereby effectively precluding operation of the transducer head at sub-micron flying heights. Moreover, the $SiO_2$ gel particles cannot be removed from the sol solution by common membrane filtration techniques prior to application of the sol solution to the substrate surface, because their resilient character enables them to deform under pressure and thereby elongate for passage through the membrane filter, after which the particles return to their original, i.e., generally spherical, shape. In addition, another factor causing large gel particle growth is related to the exothermic nature of the acid-catalyzed hydrolysis reaction of the silicon alkoxide compound, inasmuch as premature $SiO_2$ gel particle growth is accelerated by the increase in solution temperature arising from the heat released during the hydrolysis reaction.

According to the present invention, however, premature growth of large $SiO_2$ gel particles due to temperature increase during hydrolysis is effectively minimized by performing the solution mixing (reaction) in a circulating water bath which removes heat generated by the exothermic reaction. In addition, and very importantly, the resultant sol solution is further treated for removal of $SiO_2$ gel particles of size above a predetermined maximum size, e.g., about 5 $\mu$m, preferably about 1 $\mu$m. Gel particle removal prior to application of the sol solution to the substrate surface is accomplished by continuously recirculating the sol solution through a depth filter (i.e., a filter with pores capable of removing particles from a fluid that may be smaller than the size of the filter pores, the particles being trapped by progressive interception during changes of direction of the pores. Such filters are available from, e.g., Pall Corporation, East Hills, N.Y., typically in the form of a thick, continuous cylinder of filter medium, i.e., a fibrous mass of non-woven, synthetic polymeric micro-fibers, e.g., polypropylene, that surrounds a central core) or by ultra-centrifugation at a very high G force of about 50,000 G and spin rate, i.e., >10,000 rpm. In either case, the dispenser of the spin-coating system utilized for application of the sol solution to the substrate surface is equipped with a membrane point-use filter (e.g., with 0.1 $\mu$m pore size) as an additional safeguard against inclusion of gel particles in the sol solution applied to the substrate surface. A polypropylene depth filter having a pore size of about 5 $\mu$m has provided 100% particle removal efficiency when utilized with sol solutions formed according to the above-described reaction (1).

By way of example, a suitable sol solution for use according to the invention may be prepared, by mixing an alkoxide, e.g., a silicon alkoxide such as tetraethoxysilane ("TEOS") or tetramethoxysilane ("TMOS"), water, and nitric acid at molar ratios of TEOS or $TMOS/H_2O/HNO_3$ of 1/4–30/>0.05. The nitric acid acts as a catalyst for conversion of the TEOS or TMOS to a $SiO_2$ sol according to the following reaction, illustratively shown for TEOS:

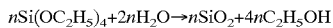
$nSi(OC_2H_5)_4 + 2nH_2O \rightarrow nSiO_2 + 4nC_2H_5OH$

Ethanol ($C_2H_5OH$) is produced as a reaction product in solution. After completion of reaction, butanol ($C_4H_9OH$) is added to the solution as a drying retardation agent at molar ratios of $TEOS/H_2O/HNO_3/C_4H_9OH$ of e.g., 1/5/0.05/>4.

As indicated above, according to the invention, heat from the exothermic reaction which can disadvantageously accelerate $SiO_2$ gel particle growth is removed from the sol solution by means of a surrounding recirculating cooling water bath and the sol solution is treated for large particle removal, either by recirculation through a depth filter having a pore size of about 5 $\mu$m for removal of gel particles of size greater than about 5 $\mu$m, preferably greater than about 1 $\mu$m, or by ultra-centrifugation at >50,000 G and >10,000 rpm, prior to being supplied to a spin-coater having a dispenser system equipped with a 0.1 $\mu$m membrane point-use filter.

In the next step according to the present invention, a relatively soft layer of a sol-gel is initially formed on the surface of the high modulus glass, ceramic, or glass-ceramic composite substrate, e.g., in disk form. By way of illustration, but not limitation, a sol-gel layer having a thickness of from about 0.2 to about 1 $\mu$m may be formed on the substrate surface by any convenient technique, e.g., spin coating of the sol solution. Such solution, when applied to the substrate surface as by spin coating, forms a very smooth film with a minimum amount of surface microwaves. A portion of the solvent(s) contained in the layer or film of sol solution is removed during the spin coating process. The resultant film or layer is glass-like, principally comprised of silica ($SiO_2$) molecular clusters together with the remaining amounts of the various solvents ($H_2O$, $C_2H_5OH$, $C_4H_9OH$), and adheres well to the substrate surface. The sol-gel film or layer is of a porous structure with the solvents saturated in the micropores thereof.

The relatively soft sol-gel film or layer applied to the hard-surfaced substrate is then subjected to a mechanical embossing process for forming a servo pattern in the surface thereof, comprising a patterned plurality of depressions and protrusions, e.g., by utilizing a stamper having a negative image of the desired servo pattern or an equivalently performing device. If desired, the exposed, upper surface of the relatively soft sol-gel layer may, after further drying in air but prior to sintering, be subjected to mechanical texturing, e.g., as by a standard NiP texturing process utilizing an abrasive size of about 0.25 $\mu$m, in order to enable formation of oriented media critical for achieving high areal density recording.

Subsequent to servo pattern formation (and mechanical texturing, if desired) of the relatively soft sol-gel film or layer, a sintering process is performed at an elevated temperature of from about 300 to above about 1000° C. (depending upon the withstand temperature of the substrate material, i.e., which temperature is higher for ceramic-based substrates than for glass-based substrates) at e.g., a ramping rate from about 0.5 to about 10° C./min. and a dwell time of about 2 hrs., to evaporate the solvents so as to effect at least partial collapse of the micro-pores, with resultant densification of the sol-gel film or layer into a substantially fully densified glass layer having a density and hardness approaching that of typical silica glass (<1.5 g/cm³), or into a partially densified "glass-like" layer. The embossed servo pattern (and mechanical texturing) formed in the exposed upper surface of the relatively soft sol-gel layer is preserved in the corresponding exposed upper surface of the sintered glass or glass-like layer. Formation of thin film magnetic media on the thus-formed glass-coated, servo-patterned/mechanically textured substrates is accomplished utilizing conventional thin film deposition techniques, e.g., sputtering, for forming the layer stack comprising a polycrystalline underlayer, magnetic layer, and protective overcoat layer.

Thus, the present invention advantageously provides improved processing techniques and methodologies, including formation of sol-gel layers with defect-free surfaces, which can be practiced at low cost to yield improved, servo-patterned substrates comprised of high hardness, high modulus materials suitable for the manufacture of high areal recording density magnetic recording media operable at sub-micron flying heights, and magnetic recording media including such improved, servo-patterned substrates.

In the previous description, numerous specific details are set forth, such as specific materials, structures, reactants, processes, etc., in order to provide a better understanding of the present invention. However, the present invention can be practiced without resorting to the details specifically set forth. In other instances well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of manufacturing a magnetic recording medium, comprising the steps of:

(a) preparing a sol solution containing solvent and gel particles;

(b) treating said sol solution to remove therefrom gel particles having a size greater than a predetermined maximum size;

(c) providing a non-magnetic substrate for a magnetic recording medium, said substrate including at least one surface;

(d) applying a layer of the treated sol solution to said at least one surface of said substrate;

(e) converting said layer of treated sol solution to a layer of sol-gel having a hardness less than that of said at least one surface of said substrate, an exposed surface of said layer of sol-gel having substantially no defects in the form of protrusions or bumps;

(f) forming a pattern in said exposed surface of said layer of sol-gel; and (g) converting said layer of sol-gel to a layer having a density and hardness substantially comparable to that of said at least one surface of said substrate, while preserving said pattern formed in step (f).

2. The method according to claim 1, wherein:

step (a) comprises forming a silica ($SiO_2$) sol solution containing $SiO_2$ gel particles.

3. The method according to claim 2, wherein:

step (a) further comprises removing heat generated during said preparing from said sol solution to minimize formation of large $SiO_2$ gel particles.

4. The method according to claim 1, wherein:

step (b) comprises treating said sol solution to remove gel particles having a size greater than about 5 $\mu$m.

5. The method according to claim 4, wherein:

step (b) comprises passing said sol solution through a depth filter having a pore size of about 5 $\mu$m.

6. The method according to claim 4, wherein:

step (b) comprises treating said sol solution by ultra-centrifugation at a G-force greater than about 50,000 G and a spin speed greater than about 10,000 rpm.

7. The method according to claim 1, wherein:

step (c) comprises providing a disk-shaped substrate formed of a glass, ceramic, or glass-ceramic material.

8. The method according to claim 1, wherein:

step (d) comprises applying said layer of said treated sol solution to said at least one surface of said substrate by spin-coating.

9. The method according to claim 1, wherein:

step (e) comprises converting said layer of treated sol solution into said layer of sol-gel by removing a portion of the solvent(s) contained in said layer of treated sol solution;

step (f) comprises mechanically embossing a servo pattern in said exposed surface of said layer of sol-gel; and step (g) comprises forming said glass or glass-like layer by substantially completely removing said solvent(s) from said layer of sol-gel.

10. The method according to claim 9, wherein:

step (e) comprises removing a portion of said solvent(s) contained in said layer of treated sol-gel solution during said step (d) of applying said layer of treated sol solution to said at least one surface of said substrate;

step (f) comprises mechanically embossing said servo pattern in said exposed surface of said layer of sol-gel by applying thereto a surface of a stamper, said surface of said stamper including a negative image pattern of said servo pattern; and step (g) comprises substantially completely removing said solvent(s) from said layer of sol-gel by sintering said layer of sol-gel at an elevated temperature for a predetermined interval.

11. The method according to claim 1, further comprising the step of:

(h) forming a stack of thin film layers over an exposed surface of said glass or glass-like layer formed in step (g), said stack of layers including at least one ferromagnetic layer.

* * * * *